Figure 2A:
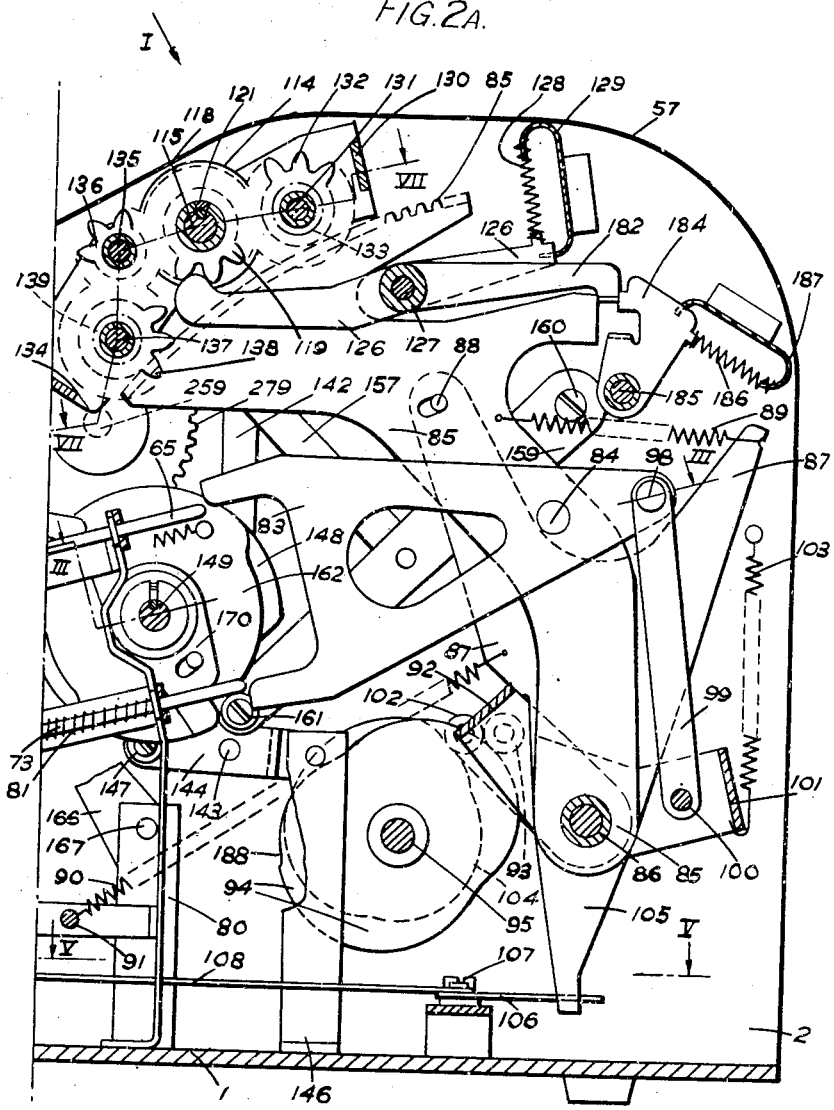

Aug. 9, 1949.  D. BROIDO  2,478,365
PARTIAL PRODUCT CALCULATOR
Filed Jan. 23, 1945  14 Sheets-Sheet 1
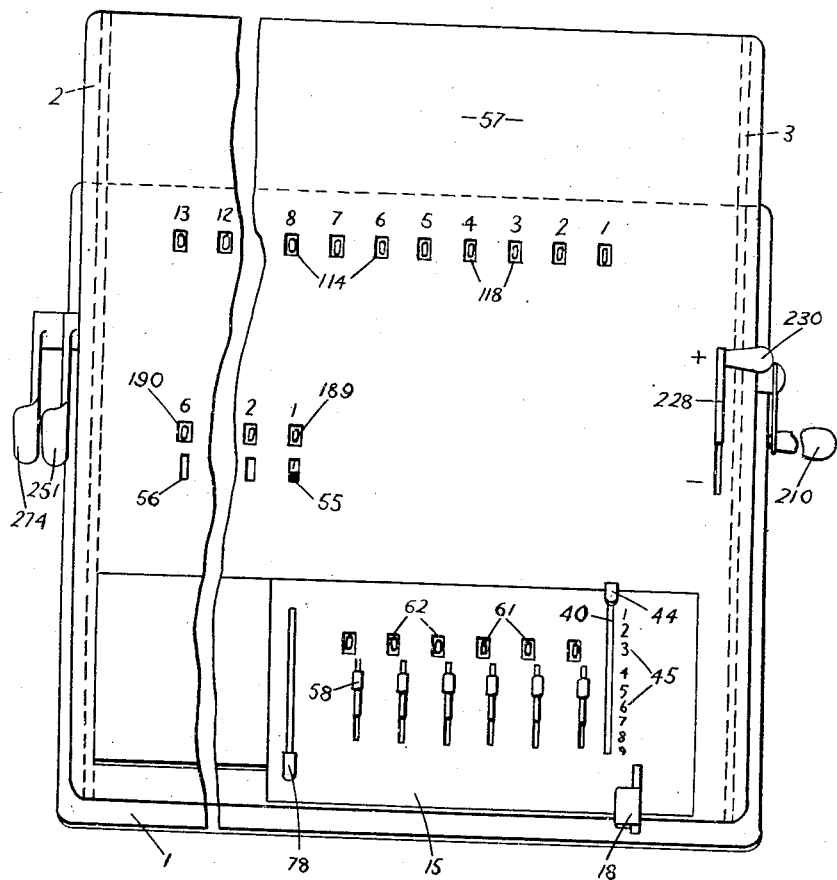
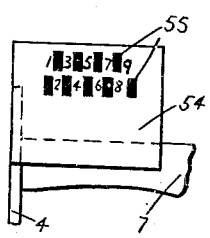
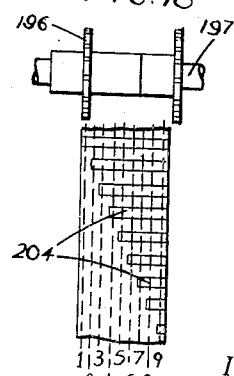
Inventor
Daniel Broido
By
Attorney Aug. 9, 1949.　　　　　D. BROIDO　　　　2,478,365
PARTIAL PRODUCT CALCULATOR
Filed Jan. 23, 1945　　　　　　　　　　　　14 Sheets-Sheet 2
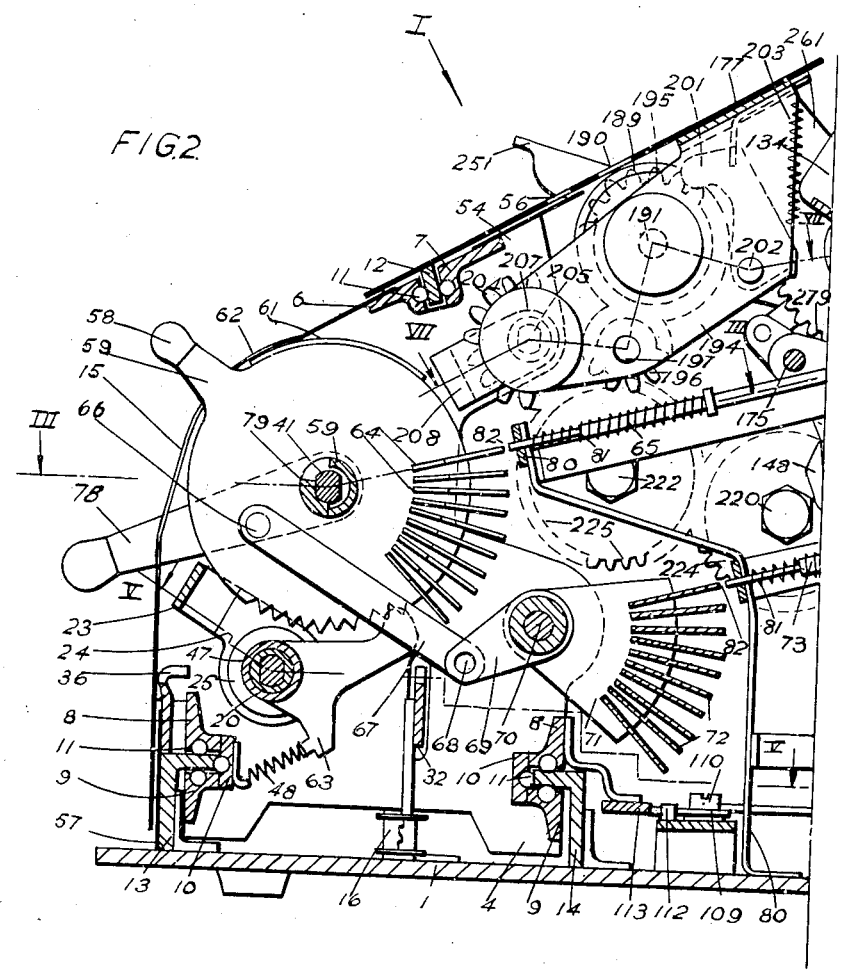
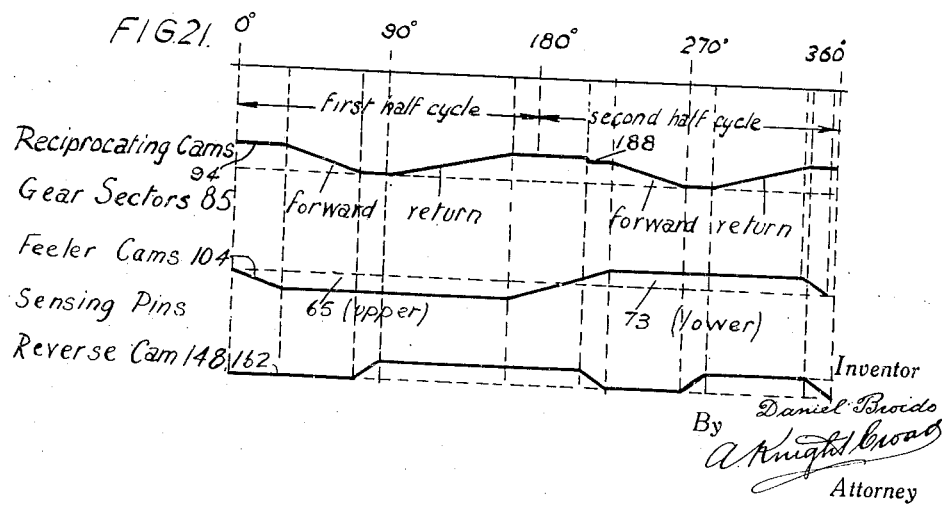
Inventor
Daniel Broido
By A. Knight Croad
Attorney

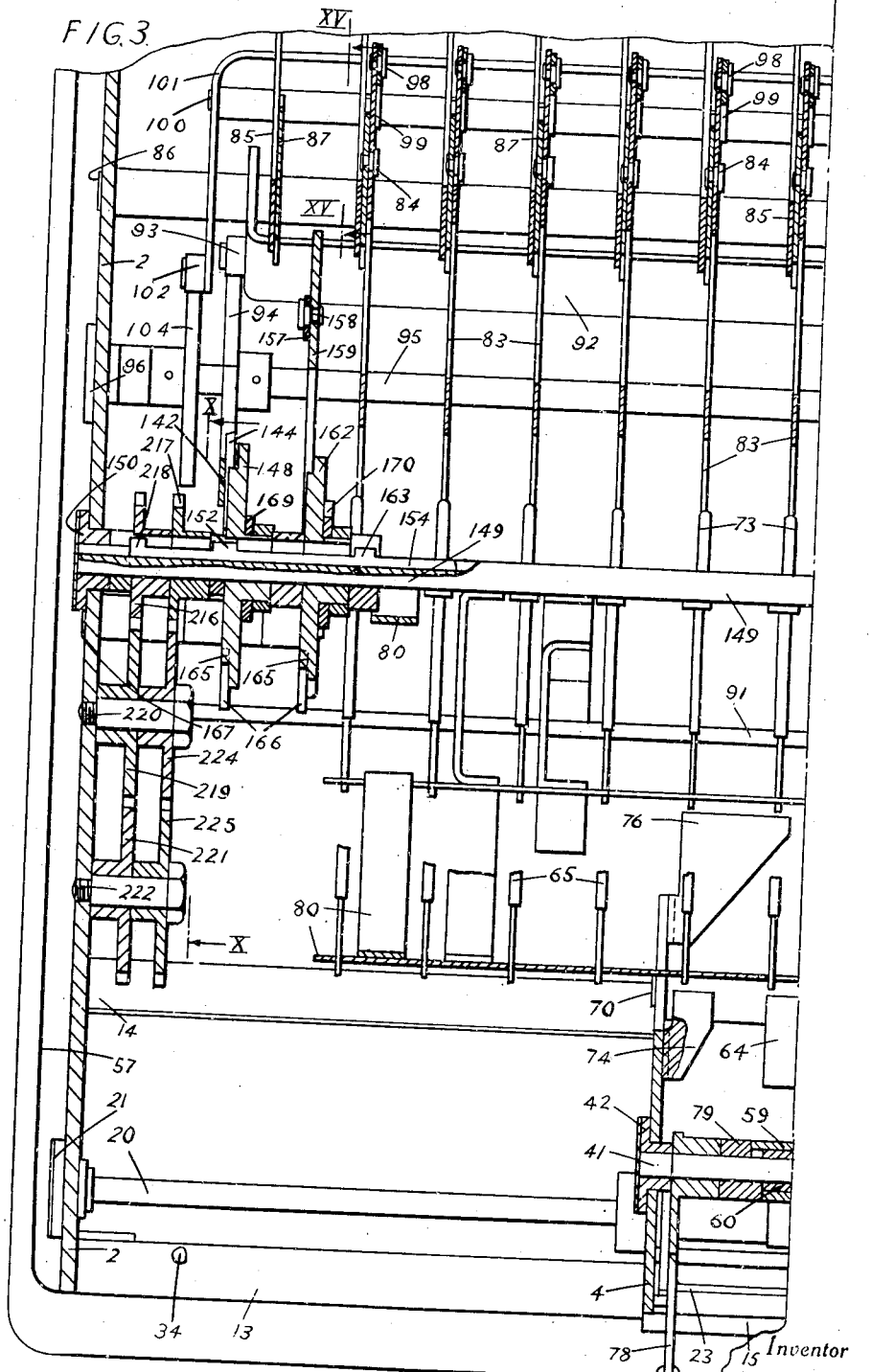

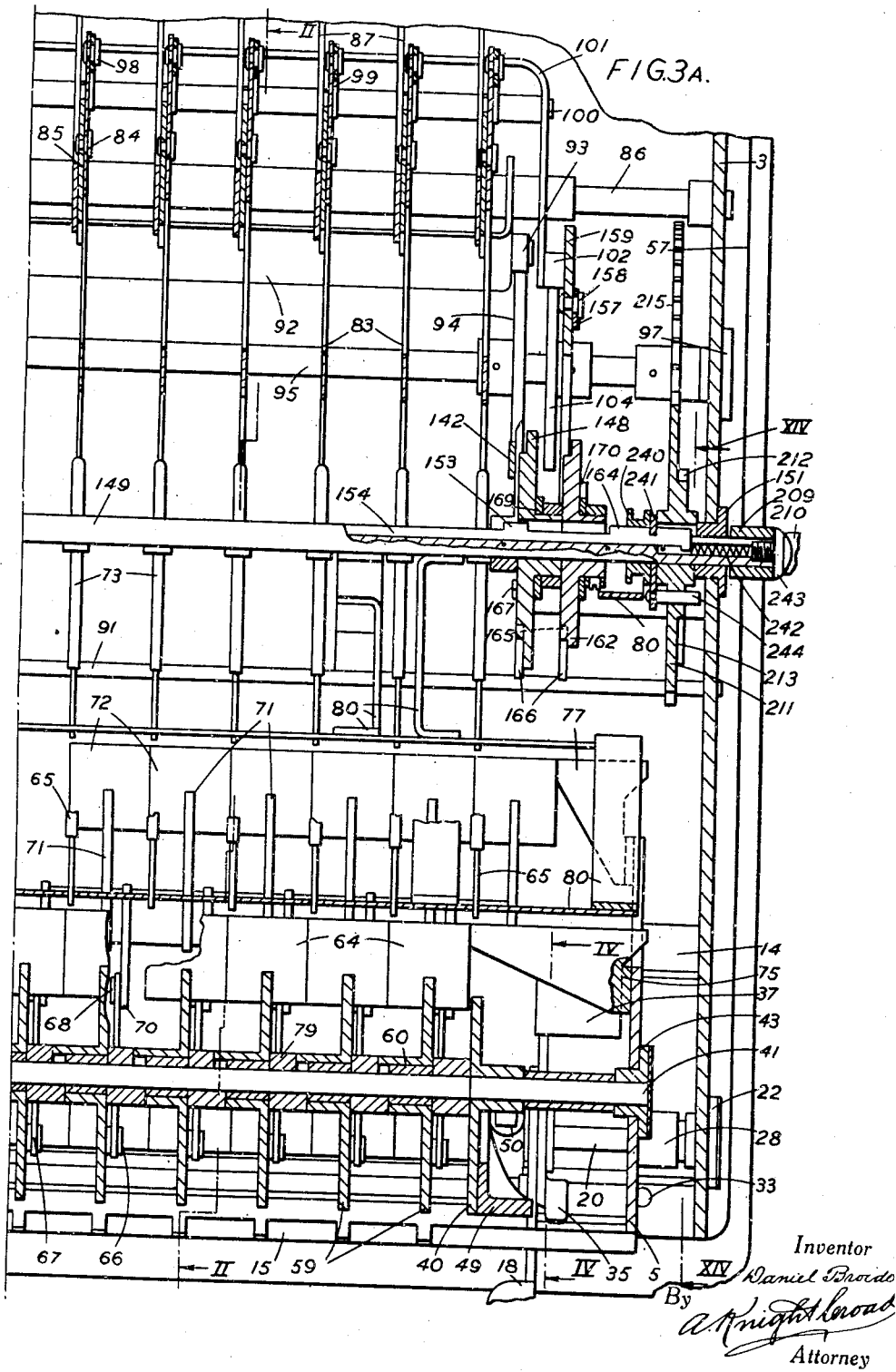

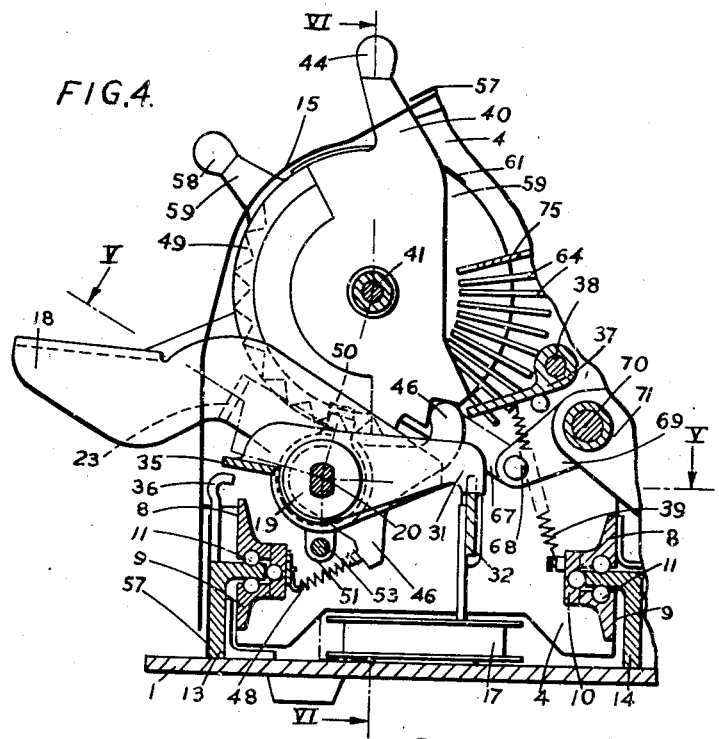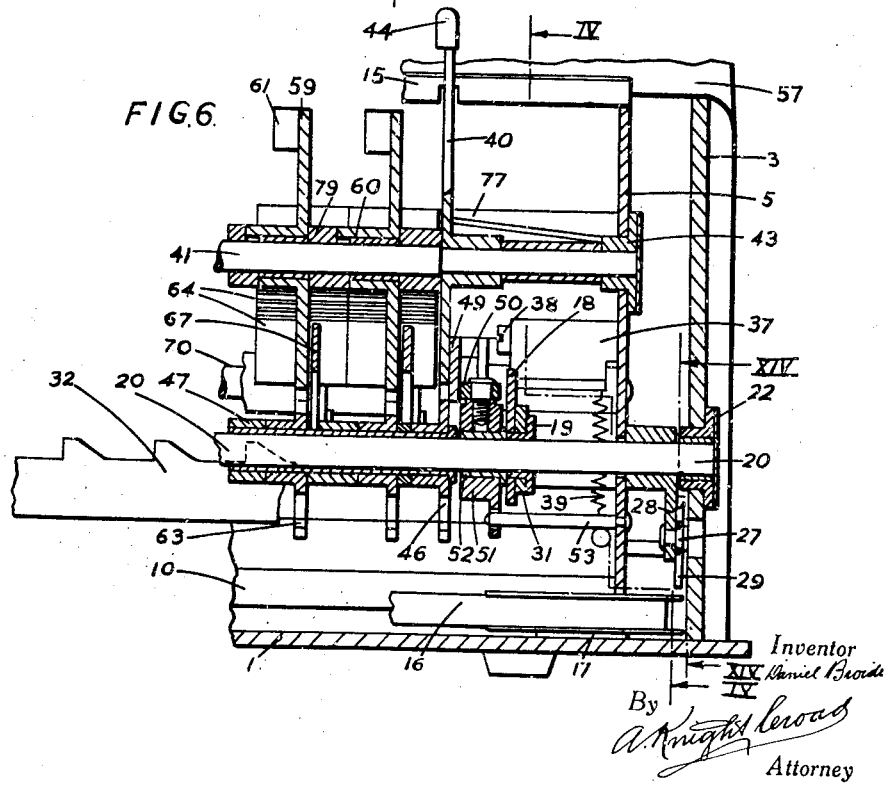

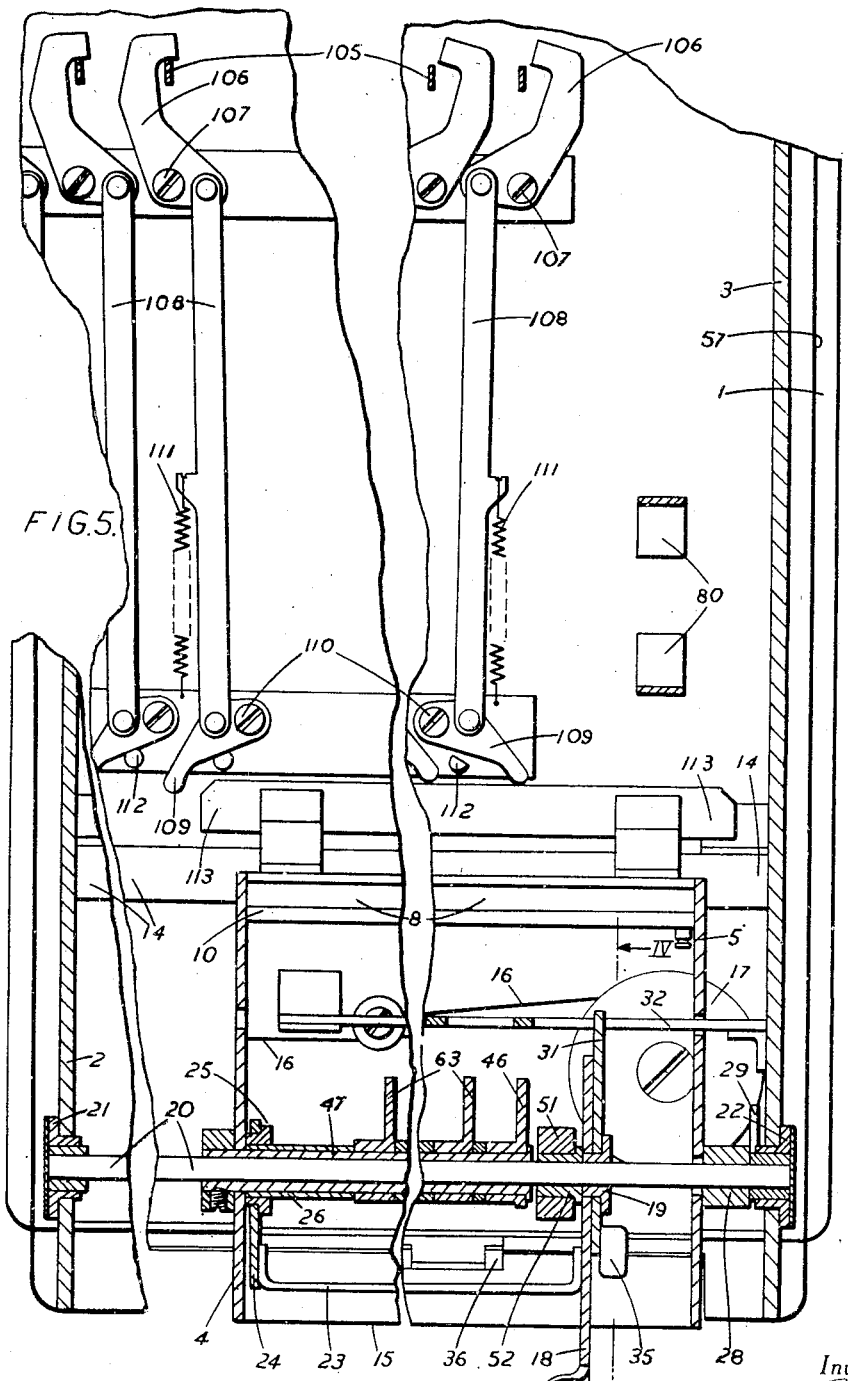

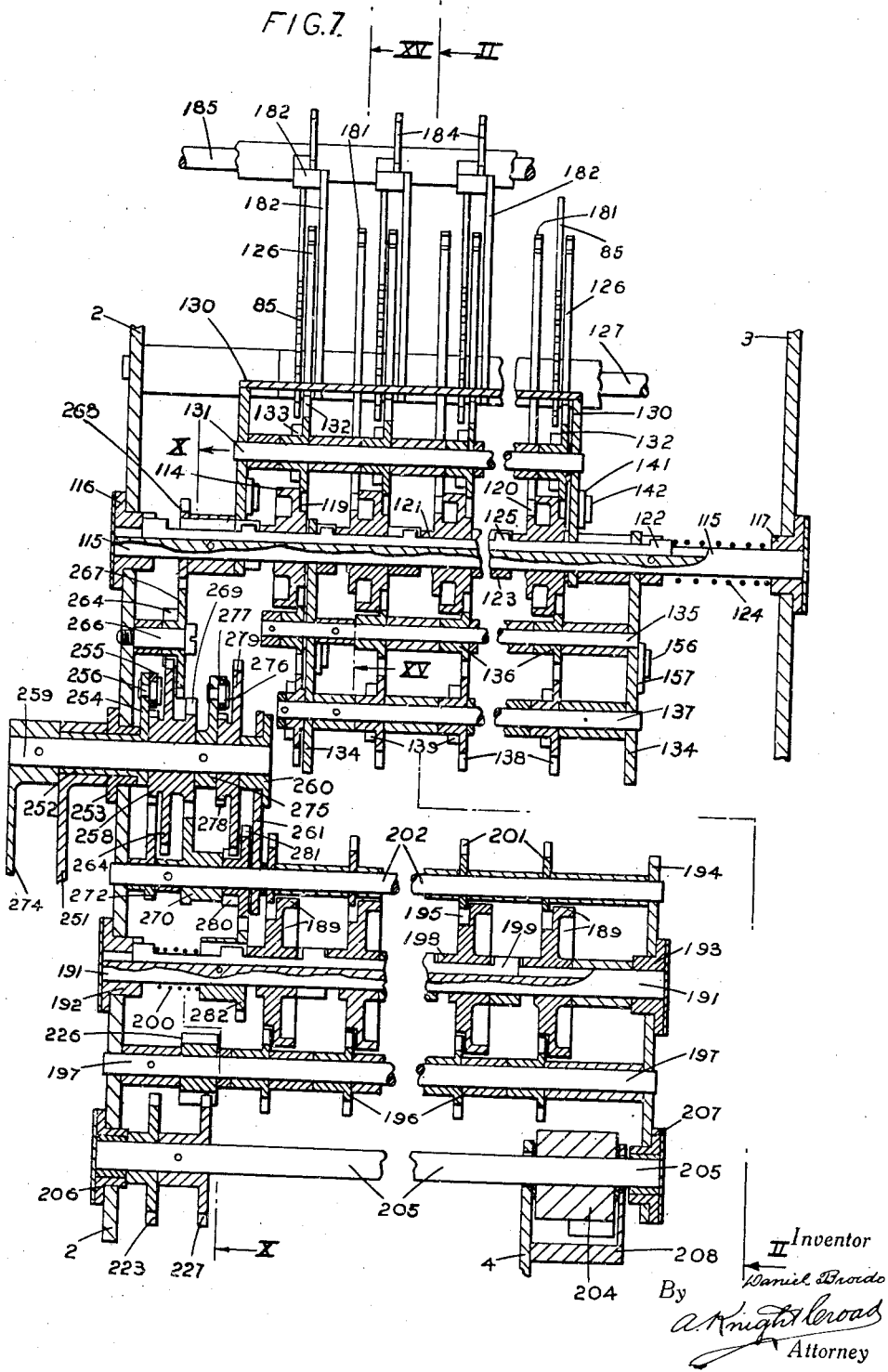

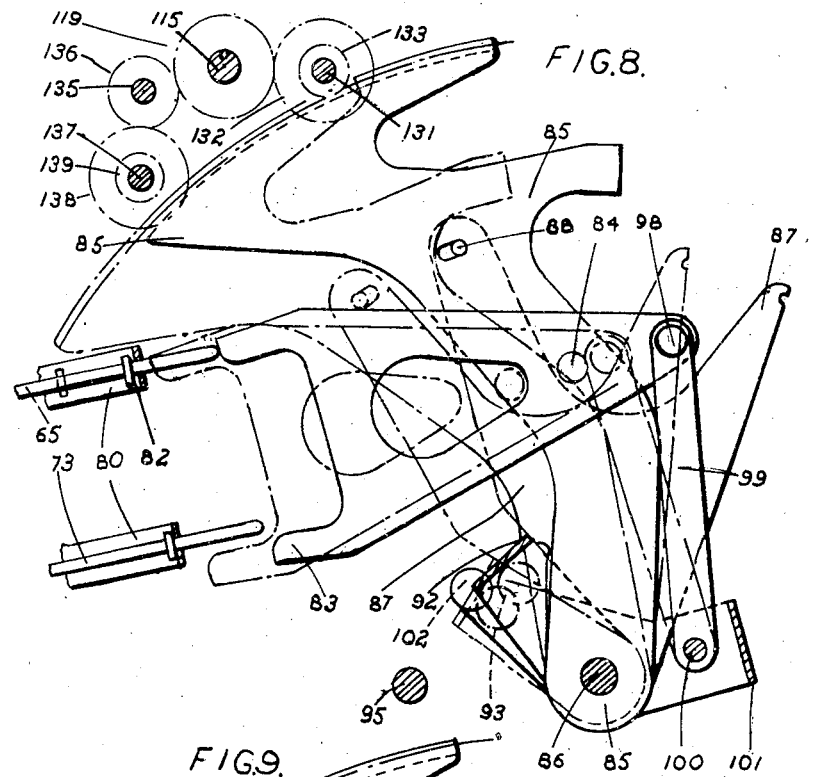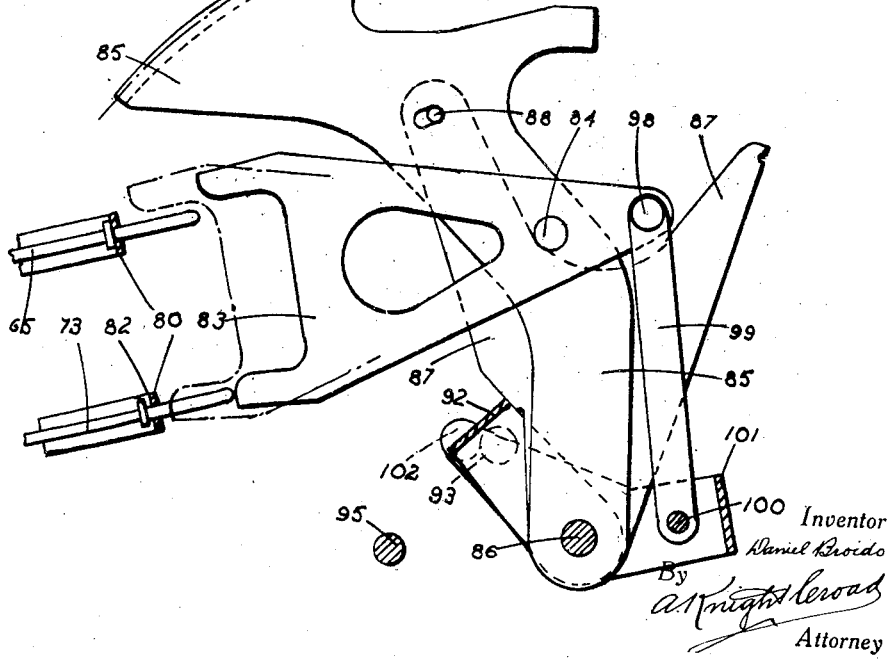

Aug. 9, 1949.                    D. BROIDO                    2,478,365
                          PARTIAL PRODUCT CALCULATOR
Filed Jan. 23, 1945                                    14 Sheets-Sheet 10

Inventor
Daniel Broido
By
A Knight Leroas
Attorney

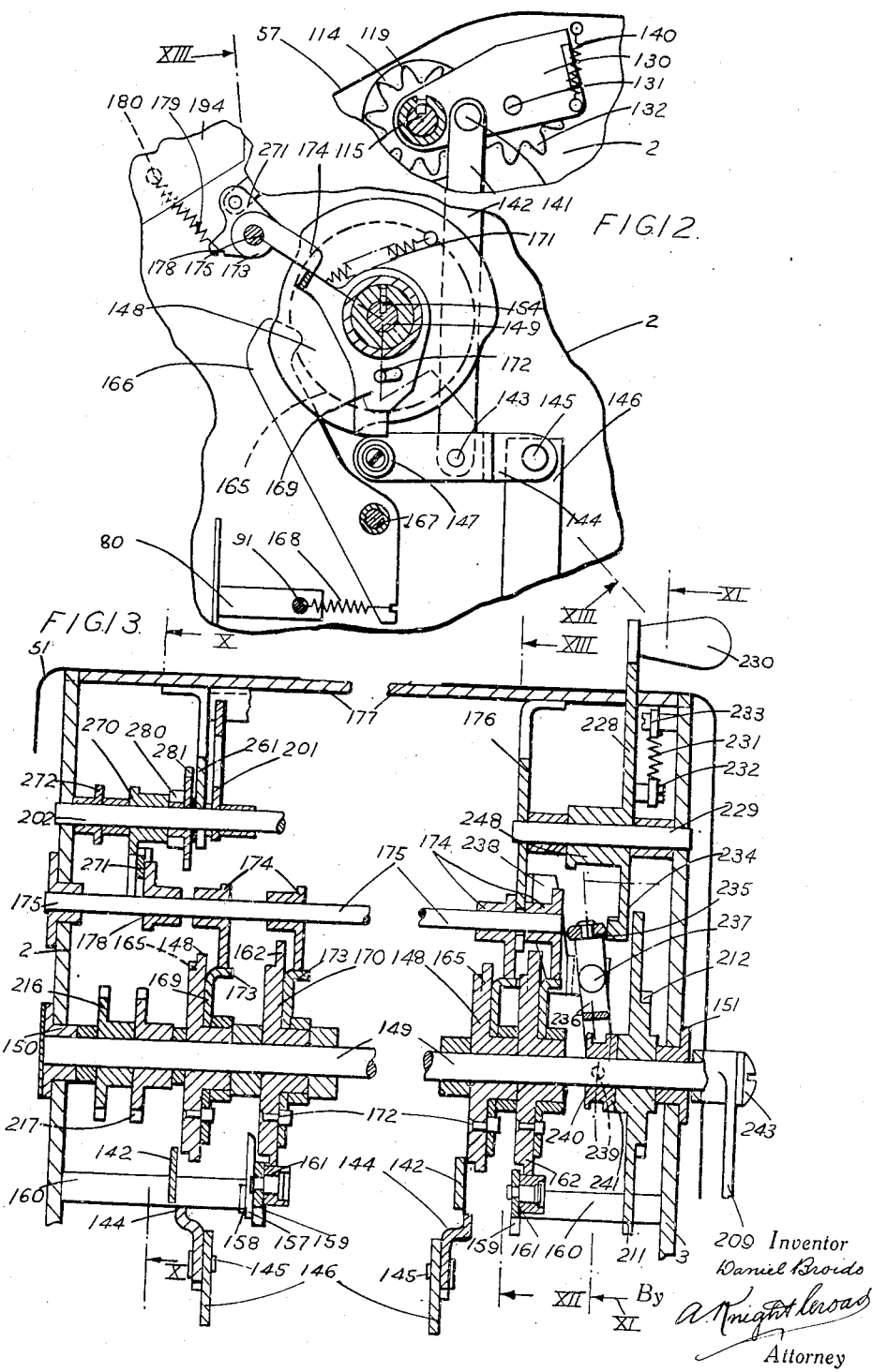

Aug. 9, 1949.	D. BROIDO	2,478,365
PARTIAL PRODUCT CALCULATOR
Filed Jan. 23, 1945	14 Sheets-Sheet 12

Inventor
Daniel Broido
By
Attorney

Aug. 9, 1949.　　　　　D. BROIDO　　　　　2,478,365
PARTIAL PRODUCT CALCULATOR

Filed Jan. 23, 1945　　　　　　　　　　　　14 Sheets-Sheet 13

Inventor
Daniel Broido
By A. Knight Cerod
　　Attorney

Aug. 9, 1949.   D. BROIDO   2,478,365
PARTIAL PRODUCT CALCULATOR
Filed Jan. 23, 1945   14 Sheets-Sheet 14
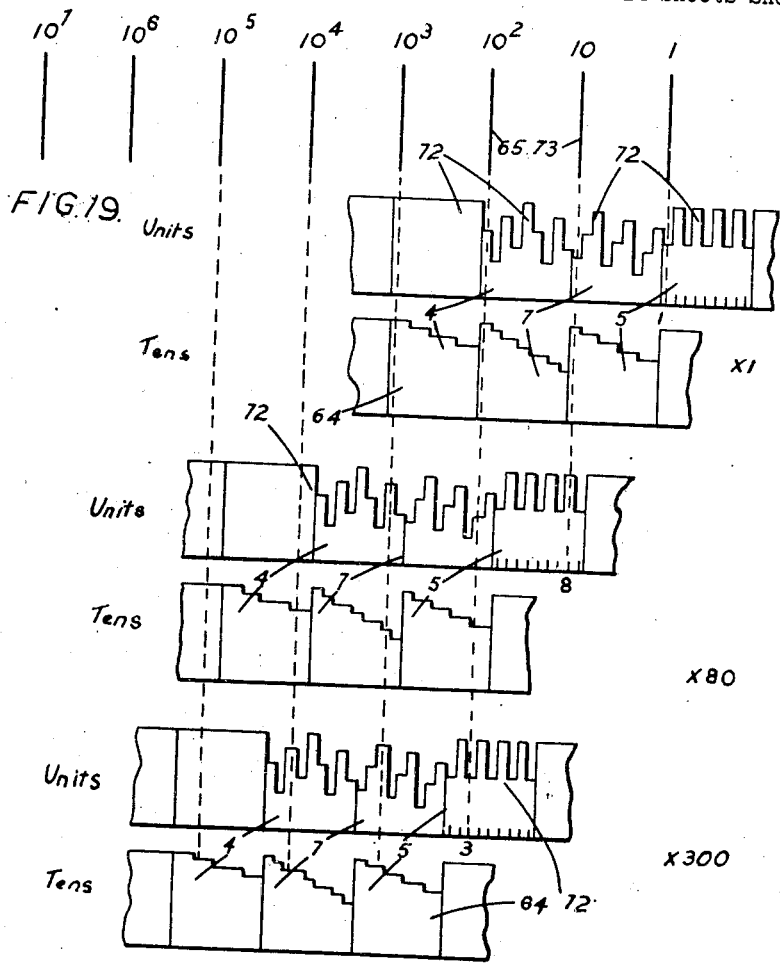
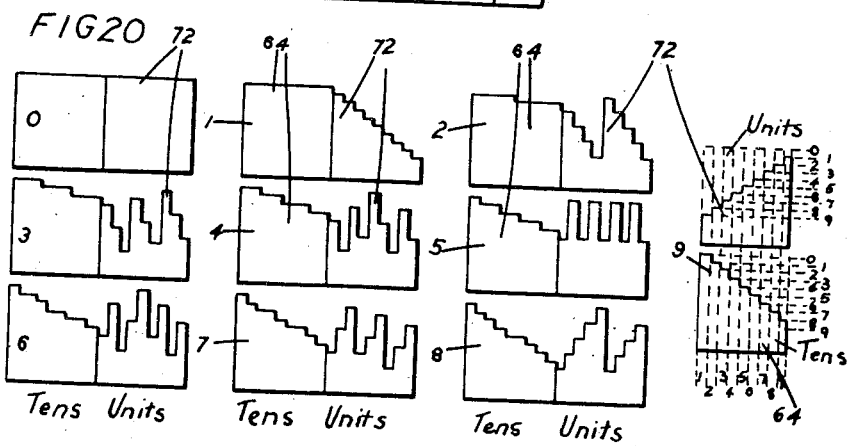
Inventor
Daniel Broido
By
Attorney Patented Aug. 9, 1949

2,478,365

UNITED STATES PATENT OFFICE 2,478,365

PARTIAL PRODUCT CALCULATOR

Daniel Broido, Cockfosters, near Barnet, England

Application January 23, 1945, Serial No. 574,065
In Great Britain February 3, 1944

2 Claims. (Cl. 235—61)

This invention relates to calculating machines of the partial products type.

Machines of this type have a marked advantage as compared with those of the repeated addition type insofar as they require only a single operating cycle per each multiplier denomination irrespective of the digit, whereas the repeated addition machines require 1–9 operating cycles according to digits 1–9 of the respective multiplier denominations. On the other hand, partial products machines are somewhat bulky and complicated, since all partial products must be stored in the machine, selected as required according to the digits of multiplicand and multiplier, and entered into the correct denominational elements of the products register according to multiplier denominations. A further difficulty is caused by the fact that the tens of a partial product of a multiplicand digit must be entered into the same denominational registering element as the units of the partial product of the next higher denomination. A further drawback of partial products machines is that they are not easily adaptable for division.

The broad object of the present invention is to provide a calculating machine of the partial products type which is relatively compact, and easy to make, fast and easy to operate, and which can be readily used for all calculations including multiplication, addition, subtraction, and division.

More specifically stated, the object of the invention is to provide a partial products calculating machine having readily displaceable representations of partial products, the selection of partial products according to the digits of the multiplier (or quotient) as well as the selection of the denominational registering elements into which these partial products are to be entered, being effected by selectively positioning the representations of partial products according to the respective digits and denominations of the multiplier (or quotient).

Further objects of this invention are as follows:

(a) To provide a calculating machine adapted to effect the whole multiplication of the set-up factor by any digit, and to enter the product either additively or subtractively into the products register in a single operating cycle without a relative displacement of the representations of partial products and the result register; so that the operation may be repeated as required in division.

(b) To provide a calculating machine having, for each set-up value, only one member carrying the representations of all partial products of the respective set-up value, the tens and the units of the partial products being arranged in two separate groups.

(c) To devise a calculating machine providing in a simple manner a visible indication not only of the set-up factor but also of the respective digit and denomination of the second factor prior to the actual operation, so that any errors may be corrected before the calculation is initiated.

(d) To provide a calculating machine with physical representations of partial products of the set-up values arranged on a carriage shiftable transversely of stationary registers and associated sensing means into a plurality of denominational positions, all said representations of each set-up value being arranged on a single member or a double member extending in the direction of the carriage shift; the representations of consecutive partial products being arranged in consecutive order in the same direction.

(e) To provide a calculating machine with a carriage shiftable transversely of a stationary multiplier (quotient) register into a plurality of denominational positions each comprising a plurality of digital positions; a driving member shiftable with the carriage being adapted during each operating cycle to enter into that denominational element of said register which corresponds to the respective denominational position of the carriage the digit corresponding to the respective digital position thereof.

(f) To provide a calculating machine with relatively simple means for automatically shifting the carriage into the next denominational position after each operating cycle during a multiplying operation.

(g) To provide a calculating machine with relatively simple means for selectively shifting the carriage into the desired denominational and digital position and for repeated operation in the same digital or denominational position during a dividing operation.

Further objects of the invention will become apparent as the description proceeds.

General arrangement

The machine about to be described has a capacity for multiplicands, divisors, etc. up to 999,999; multipliers or quotients up to 999,999; and products, dividends, or sums up to 9,999,999,999,999; however, it will be understood that a machine made according to the invention may be of any capacity. The machine comprises, generally, a set-up mechanism, a feeler mechanism, a products register, a multiplier (quotient) register, driving and operating means, and associated devices.

Figure 10:
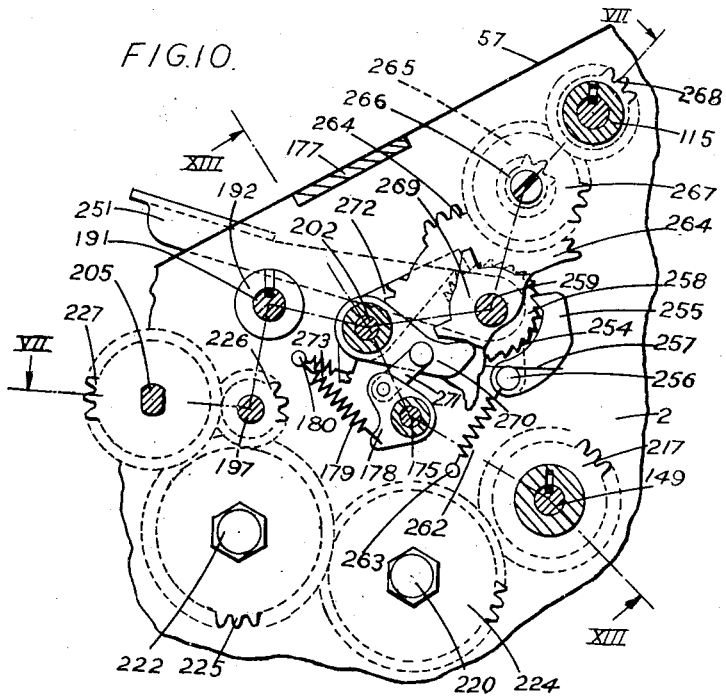
Figure 4:
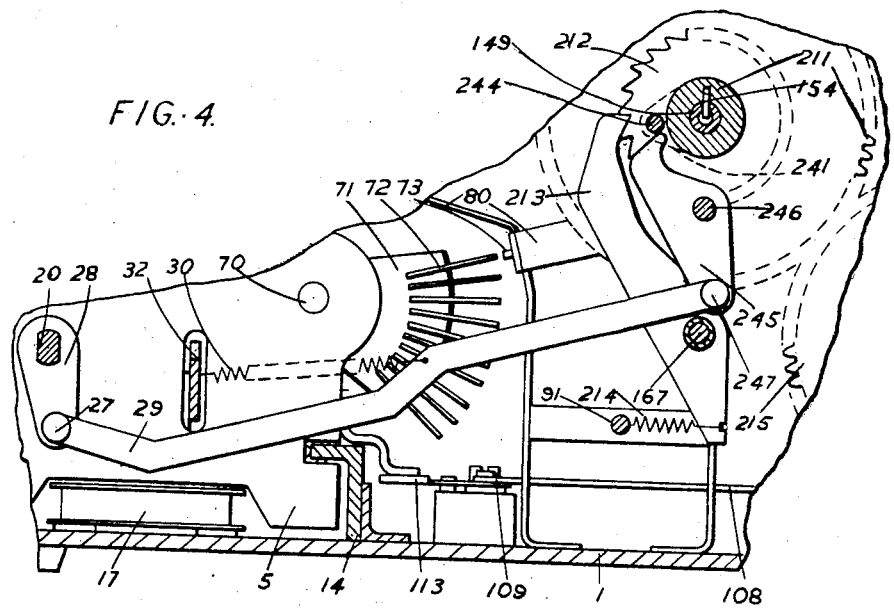
Figure 22:
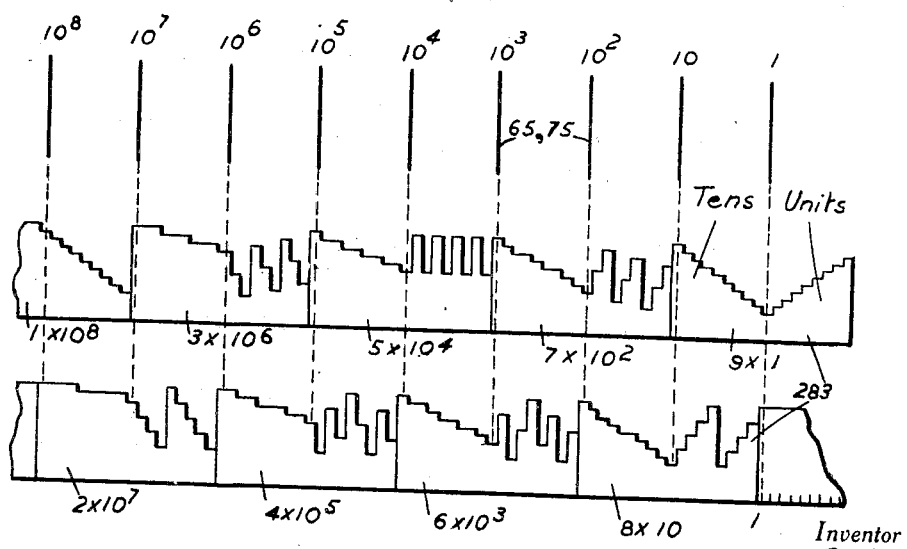

In the accompanying drawings illustrating a preferred embodiment of the invention:

Figure 1 is a view, on a reduced scale, of the machine taken in the direction of arrow I in Figures 2, 2A, Figures 2 and 2A together represent a vertical section on lines II—II of Figures 3A and 7, Figures 3 and 3A together represent a section on line III—III of Figures 2, 2A, Figure 4 is a fragmentary vertical section on line IV—IV of Figures 3A, 5, and 6, Figure 5 is a horizontal section on line V—V of Figures 2, 2A and 4, Figure 6 is a vertical section on line VI—VI of Figure 4, Figure 7 is a section on line VII—VII of Figures 2, 2A and 10, Figure 8 is a section taken in the same plane as Figures 2, 2A showing certain parts of the feeler mechanism, Figure 9 illustrates another position of details shown in Figure 8, Figure 10 is a fragmentary vertical section on line X—X of Figures 3, 7, and 13, Figure 11 is a vertical section on line XI—XI of Figure 13, Figure 12 is a similar section on line XII—XII of Figure 13, Figure 13 is a section on line XIII—XIII of Figures 10, 11, and 12, Figure 14 is a vertical section on line XIV—XIV of Figures 3A and 6, Figures 15 and 16 are fragmentary vertical sections on line XV—XV of Figures 3 and 7 showing different positions of the carry device, Figure 17 is a plan view of a detail as seen in the direction of arrow I in Figure 2, the machine cover being removed, Figure 18 shows, partly in development and partly in front elevation, details of the multiplier register, Figure 19 shows diagrammatically the arrangement of the partial products plates, Figure 20 shows a complete denominational set of partial products plates, Figure 21 is a timing chart, and Figure 22 shows modified partial product plates.

The operating parts are mounted on base plate 1 in a supporting structure comprising side frames 2, 3, Figs. 1, 2A, 3, 3A. In Fig. 1, showing the general arrangement, the set-up mechanism is indicated at 58, the products register at 114, and the multiplier register at 189.

Set-up mechanism

The set-up mechanism is mounted on a carriage shiftable transversely of the machine. As shown in Figs. 2–6, the carriage comprises side plates 4, 5 rigidly interconnected by bars 6, 7 and two pairs of bars 8, 9, 10; Fig. 2, which have balls 11 adapted to roll along rails 12, 13, 14 secured in the supporting structure. The carriage has a cover 15 and is normally drawn to the right as viewed in Fig. 1 by a spring 16 in spring barrel 17.

The carriage, which is normally located in the extreme right-hand position shown in Fig. 1, can be shifted transversely of the machine into five more "denominational" positions; one of these six positions is reserved for each possible denomination of the multiplier, as will be fully described hereafter. In each denominational position the carriage can assume any one of nine "digital" positions, according to the digit of the respective multiplier denomination. Thus, in order to multiply by 500, the carriage is shifted into the fifth digital position of the third (hundreds) denominational position. In the following description, "right" and "left" refers to the view of Fig. 1, unless otherwise specified, while "clockwise" and "anticlockwise" means as seen from the right in Fig. 1, that is from the side where handle 210 is situated, and "forward" means towards the front of the machine.

The denominational shift of the carriage is effected by means of a shift lever 18, Figs. 4 and 5, fast on bush 19 slidable on a flat shaft 20 rotatable in bearings 21, 22 in machine frames 2, 3, respectively. A tie-rod 23 (see also Fig. 2) rigidly connects shift lever 18 with a bail 24 fast on bush 25, Fig. 5, slidable on sleeve 26. Pivoted at 27, Fig. 14, to a bracket 28 fast on shaft 20 is a rod 29; a spring 30 anchored in the supporting structure tends to pull the rod 29 to the left as viewed in Fig. 14, and thus to rock the shaft 20 clockwise, so that a pawl 31, Figs. 4 and 5, fast on lever 18 is caused to engage, in all but the initial position of the carriage, a toothed rack 32 mounted in the supporting structure. The initial position of the carriage is determined by a fixed stop 33, Fig. 3A, while carriage movement to the left is limited by another fixed stop 34, Fig. 3. In any but the initial position of the carriage, when shift lever 18 is depressed, pawl 31 is lifted out of engagement with rack 32, and spring 16 causes the carriage to shift approximately half a denominational step to the right, whereupon a forward extension 35, Figs. 4, 5, on pawl 31 engages a tooth of a second rack 36. When the shift lever 18 is released, the carriage is shifted a further half-step to the right until pawl 31, rocking downwards under the influence of spring 30, engages the next tooth on rack 32, so that the carriage completes a full one-step movement into the next lower denominational position.

The depression of shift lever 18 is resiliently limited by a plate 37, Figs. 4 and 6, rockable on pivot 38 and biased downwards by spring 39. When shift lever 18 is being depressed and pawl 31 just clears the tooth on rack 32, the upper edge of pawl 31 strikes against plate 37, thus indicating to the operator that he may now release the shift lever 18 if only a one-step carriage shift is intended. However, if a considerable shift in either direction is required, the operator may continue to depress shift lever 18, thus stretching spring 39, until the forward extension 35 on pawl 31 abuts against rail 8, so that extension 35 clears rack 36. The operator may now shift the carriage to the left any desired distance by pushing the shift lever 18 accordingly, or he may allow the spring 16 to pull the carriage to the right.

The digital shift is effected, in any denominational position, by displacing the carriage relatively to shift lever 18 and pawl 31. For this purpose, a digital shift lever 40, Figs. 4, 6, 3A, is rockably mounted on shaft 41 journalled in bearings 42, Fig. 3, and 43, Fig. 3A, in carriage plates 4, 5 respectively. Lever 40 can be rocked by means of a knob 44 into any one angular position 1–9 indicated on carriage cover 15 as at 45, Fig. 1. Detent 46, Figs. 4–6, rockable on sleeve 47 on shaft 20 is biased by spring 48 into engagement with teeth formed on lever 40 in order to locate the latter in any one of its nine angular positions. A face cam 49 (see also Fig. 3A) is pressed by carriage spring 16 on to a roller 50 rotatable in a bracket 51 secured to bush 52, Fig. 6, slidable on shaft 20 adjacent to the denominational shift lever 18. Pin 53 secured to carriage plate 5 prevents bracket 51 from rocking with shaft 20. Cam 49 is so shaped that when lever 40 is in the upright position "1" shown in Fig. 4, the parts are in relative positions shown in Fig. 6; when knob 44 on lever 40 is shifted anti-clockwise into position "2," cam 49 forces the carriage to move towards the left away from shift lever 18 a distance equal to one ninth of the pitch of rack 32, and so forth, which distance may be termed a "digital step." When knob 44 is pulled down into the lowest position "9," the carriage shifts eight digital steps away from the denominational shift lever 18 and pawl 31.

The digital and denominational positions of the carriage are indicated by a plate 54, Figs. 17 and 2, secured near the top of the left-hand carriage plate 4. Plate 54 has nine numerals 1–9 conveniently arranged in two rows, a coloured mark 55 being placed below or above each numeral. In any position of the carriage, a numeral and its associated mark 55 is visible through one of apertures 56 in machine cover 57; one of apertures 56 is provided for each denominational position of the carriage, which is indicated by mark 55 appearing in the respective aperture 56, while the digital position of the carriage is indicated by the numeral visible in this aperture. Thus, in Fig. 1 a mark 55 visible in the extreme right-hand aperture 56 indicates that the carriage is in the first denominational position corresponding to the units of the multiplier, and the numeral "1" visible in this aperture indicates the first digital position corresponding to the digit 1; thus, in the position shown in Fig. 1, the carriage is adjusted for "1 units" multiplier; this position of the carriage is hereafter referred to as the initial position. Should, for instance, numeral "9" appear in the extreme left-hand aperture 56, the carriage would be set for "9 hundreds-of-thousands" multipler, or 900,000. Since when a mark 55 is visible in an aperture 56 the associated numeral is also visible in this aperture, marks 55 may be omitted if desired.

The multiplicand is set up by means of knobs 58 on bails 59, Fig. 2, each bail being rotatable on a bush 60, Fig. 3A, fixedly mounted on shaft 41. Fixed to each bail 59 is a strip 61, Figs. 2 and 6, with numerals 0–9 visible through an aperture 62 in carriage cover 15. Each bail 59 has locating teeth co-operating with a detent 63 rockable on sleeve 47 on shaft 20 and biased on to respective bail by a spring 48. To facilitate the setting, numerals 0–9 (not shown) may be provided on carriage cover 15 along the slots through which the bails 59 protrude.

There is one bail 59 for each multiplicand denomination within the machine capacity; the present embodiment comprises six bails 59. Fixedly mounted on each bail 59 are ten plates 64 representing, in a manner to be fully described hereafter, the tens of partial products 0–9. Plates 64 co-act with a bank of sensing pins 65, Figs. 2 and 3A; by adjusting a knob 58 so that a certain numeral, say 9, appears in the respective aperture 62, the plate 64 associated with numeral 9 is aligned with pins 65, this plate containing representations of the tens of all partial products of this numeral, thus:

$9 \times 1 = 0$ tens
$9 \times 2 = 1$ tens
$9 \times 3 = 2$ tens
$9 \times 4 = 3$ tens
$9 \times 5 = 4$ tens
$9 \times 6 = 5$ tens
$9 \times 7 = 6$ tens
$9 \times 8 = 7$ tens and $9 \times 9 = 8$ tens Linked at 66 to each bail 59 is a connecting rod 67 linked at 68 to a crank 69 rockable on a shaft 70 fixedly mounted in carriage plates 4, 5. Each crank 69 is fixed to a bail 71 having ten plates 72 representing the units of the partial products; plates 72 co-act with sensing pins 73 of a second bank. Taking the above example, when knob 58 on a bail 59 is set to "9," a units plate "9" on the respective bail 71 presents to the sensing pins 73 the units of partial products of 9, thus:

$9 \times 1 = 9$ units
$9 \times 2 = 8$ units
$9 \times 3 = 7$ units
$9 \times 4 = 6$ units
$9 \times 5 = 5$ units
$9 \times 6 = 4$ units
$9 \times 7 = 3$ units
$9 \times 8 = 2$ units and $9 \times 9 = 1$ units Plates 74, 75, Figs. 3, 3A, and plates 76, 77 fixed to carriage plates 4, 5 in line with upper pins 65 and lower pins 73, respectively, serve to fill the space between carriage plates 4, 5 as far as sensing pins 65, 73 are concerned.

All denominational sets of partial products plates 64, 72 are exactly alike; one such set is shown by way of illustration in Figure 20. Each plate is notched so as to represent the tens or the units of the respective numeral in a manner clearly shown in the case of plates associated with numeral 9, all other plates being formed similarly; the "0" plates are naturally not notched at all. Each pair of plates 64, 72 may be thought to be divided into nine vertical strips of equal width, as indicated by two lines of numerals below the tens plate associated with 9. Each strip is reserved for the notch representing the digit of the product of the respective set-up numeral (in this case, 9) by the respective multiplier numeral. On each plate are marked ten imaginary horizontal equidistant lines, designated by numerals 0–9 on the right hand side of the drawings; these lines indicate the respective value of tens or units of the partial product, whereby line "0" coincides with the original top edge of the plate. Thus, in the vertical strip "1" the units plate 72 is cut down to the level "9," since $9 \times 1 = 9$ units, and the tens plate 64 is not notched at all, since $9 \times 1 = 0$ tens. In strip "2" the unit plate is cut down to level "8" and the tens plate to level "1," since $9 \times 2 = 1$ tens + 8 units, and so forth. Strip "9" contains notches cut to level "1" in units plate and "8" in tens plate, since $9 \times 9 = 8$ tens + 1 units. Thus, the depth of each notch is proportionate to the digit represented by the notch.

Figure 19 shows diagrammatically the manner in which the partial products plates are arranged in the machine in operative relationship with sensing pins 65, 73. There is one pair of pins 65, 73 associated with each denomination of the product, each pair being indicated by a vertical line designated 1, 10, $10^2$ . . . (units, tens and so forth). Fig. 19 corresponds roughly to a plan view of the mechanism, and since the two pins 65, 73 of each pair are arranged in the same vertical plane, they are represented by a single line. The transverse distance between each pair of pins 65, 73 is the same in all cases; it is equal to the denominational step of the carriage as heretofore described. The units plates 72 and the tens plates 64 belonging to the same set-up denomination are transversely offset as shown, so that when the units plate "5" is aligned with pin 73 of the "1" pair, its associated tens plate is aligned with pin 65 of the "10" pair, and so forth.

Figure 19 illustrates the multiplication 475×381, and it shows the partial products plates associated with "4 hundreds," "7 tens," and "5 units" in the transverse positions reserved for multiplication by 1, 80, and 300, respectively. Considering first the multiplication by 1, the carriage is in the initial position, the first strip "1" on all partial products plates being aligned with sensing pins of the respective pairs, as indicated by numeral "1" on the right-hand plate being aligned with the units (1) pair of sensing pins. The sensing pins will sense the following amounts:

| Sensing pins | $10^2$ (hundreds) | 10 (tens) | 1 (units) |
|---|---|---|---|
| Units plates 72 | 4 | 7 | 5 |
| Tens plates 64 | 0 | 0 | 0 |
|  | 4 | 7 | 5 =475 |

In order to multiply by 80, the carriage is shifted to the left into the second (tens) denominational position and into the "8" digital position, as indicated by the numeral 8 being aligned with the "10" pair of sensing pins. The readings are as follows:

| Sensing pins | $10^4$ (tens of thousands) | $10^3$ (thousands) | $10^2$ (hundreds) | 10 (tens) | 1 (units) |
|---|---|---|---|---|---|
| Units plates 72 | 0 | 2 | 6 | 0 | 0 |
| Tens plates 64 | 3 | 5 | 4 | 0 | 0 |
|  | 3 | 8 | 0 | 0 | 0 =38,000 |

In order to multiply by 300, the carriage is shifted into the third (hundreds) denominational position and into the "3" digital position, as indicated by numeral 3 on the right hand plate being aligned with the $10^2$ pair of sensing pins. The readings are as follows:

| Sensing pins | $10^5$ | $10^4$ | $10^3$ | $10^2$ | 10 | 1 |
|---|---|---|---|---|---|---|
| Units plates 72 | 0 | 2 | 1 | 5 | 0 | 0 |
| Tens plates 64 | 1 | 2 | 1 | 0 | 0 | 0 |
|  | 1 | 4 | 2 | 5 | 0 | 0 =142,500 |

The sum of these three sub-products 475+ 38,000+142,500=180,975 is the final product. In actual operation, the multiplication by 300 is preferably effected first, then the multiplication by 80, and finally the multiplication by 1.

Setting levers 58 may be restored individually, or collectively by means of a restoring lever 78, Figs. 2 and 3, fast on shaft 41. Adjacent to each bail 59 is a restoring bush 79 fast on shaft 41. Adjacent ends of each bush 79 and of its associated bail 59 are formed as a dog clutch; as clearly shown in section in Fig. 2, bails 59 are free to rock anti-clockwise through a certain angle around their bushes 60 (Fig. 3A), but when the restoring lever 78 and shaft 41 are rotated clockwise, restoring bushes 79 pick up their associated bails 59 and restore them to the initial position in Fig. 2. Lever 78 is restored by its own weight or by a spring (not shown).

Feeler mechanism

Sensing pins 65, 73 (Figs. 2, 2A, 3, 3A, 8, 9) are slidably mounted in a frame 80 secured to base plate 1; they are biased by springs 81 away from products plates 64, 72, so that normally there is a clearance 82, Fig. 2, sufficient for a free transverse movement of the carriage. Pins 65, 73 co-act with double-pronged feelers 83, each of which is pivoted at 84, Fig. 9, to a gear sector 85 rockable on a shaft 86 fixedly supported in machine frames 2, 3. There is one gear sector 85 for each possible denomination of the product; an additional gear sector, without a feeler 83, is shown on the left in Fig. 3; it is reserved for the highest denomination operated solely by the carry device, as will be described in due course. A lever 87, Fig. 9, is rockably mounted on shaft 86 adjacent to each gear sector 85; a pin 88 fixed to lever 87 engages a slot in the associated gear sector 85, and a spring 89, Fig. 2A, interconnects each lever with its gear sector. A spring 90 anchored on a rod 91 secured in frame 80 tends to rock each lever 87 anti-clockwise as viewed in Fig. 2A, vis., onto a restoring bar 92 which extends across the machine and is at each end rockably mounted on shaft 86. Bar 92 is biased anti-clockwise by its own weight or a spring (not shown); a roller 93 journalled at each end of bar 92 co-acts with a cam 94 fast on a shaft 95 rotatable in bearings 96, 97, Figs. 3, 3A, in machine frames 2, 3. Cams 94 are so shaped that during the first half of each revolution of cam shaft 95 the restoring bar 92 releases the levers 87 for anticlockwise movement under the influence of springs 90, whereupon it restores the levers; during the second half-turn of shaft 95 this operation is repeated, so that during each revolution levers 87, and consequently gear sectors 85, are reciprocated twice.

Each feeler 83 is linked at 98, Fig. 9, to a rod 99 connecting it to a cross-rod 100 secured in a rocking frame 101 mounted at each end on shaft 86. Rollers 102, one at each end of rocking frame 101, are pressed by springs 103, Fig. 2A, on to cams 104 fast on cam shaft 95. Rods 99, cross-rod 100, frame 101 and cams 104 serve to adjust the prongs of feelers 83 in line with upper sensing pins 65 or lower sensing pins 73, respectively. Normally feelers 83 are in the position shown in Fig. 2A, the prongs of feelers 83 not touching the sensing pins 65, 73. When the cam shaft 95 begins to rotate, cams 104 cause frame 101 to rock slightly anti-clockwise, so that cross-rod 100 and rods 99 move upwards and rock the feelers 83 slightly anti-clockwise into position shown in full lines in Fig. 8; upper prongs on feelers 83 are aligned with upper sensing pins 65 and push them slightly to the left (towards the front of the machine) a distance indicated at 82, which is equal to clearance 82, Fig. 2, so that the forward ends of sensing pins 65 just touch the partial products plates 64, or just begin to enter notches therein, as the case may be. In this position, the lower prongs of feelers 83 are clear of the lower sensing pins 73. Reciprocating cams 94 now release the restoring bar 92, and levers 87 together with gear sectors 85 rock anti-clockwise, while the upper prongs on feelers 83 into the notches the respective sensing pins 65 into the notches in the partial product plates 64. Pivots 84, 98, cross-rod 100, and shaft 86 are arranged in a parallelogram, so that the prongs of feelers 83 move along lines substantially parallel to the axis of sensing pins 65, 73. The amount of movement of each co-operating group of parts comprising a sensing pin 65, a feeler 83, a gear sector 85, and a lever 87 obviously depends on the depth of notch sensed by the respective pin 65, and since this depth is proportionate to the particular digit represented by the notch, the stroke of gear sector 85 is also proportionate to this digit. Dash-and-dot lines in Figure 8 indicate positions of the various parts at the end of the first half-turn after sensing the deepest possible notch representing "9" (actually, in the case of the tens products plates 64 the highest digit is 8).

On completion of the first half-turn, cams 104 swing rocking frame 101 clockwise, so that rods 99 rock feelers 83 into position shown in Fig. 9; the lower prongs are now in alignment with lower sensing pins 73, while the upper prongs are clear of upper sensing pins 65. Feelers 83, gear sectors 85, and levers 87 are again moved forward a distance determined by the depth of notches in the units partial products plates 72. The furthest position reached by the prongs of feelers 83 after sensing a "9" is shown in dash-and-dot lines. It will be understood that if a sensing pin 65 or 73 does not encounter a notch (as, for instance, in the case of zero values), it does not move beyond the clearance 82, and the respective gear sector 85 does not move appreciably at all. Towards the end of second half-turn the parts are again restored into positions shown in full lines in Fig. 9, and near the end of full turn of cam shaft 95 the feelers 83 again assume the neutral position shown in Fig. 2A. The coordination of cams 94, 104, sensing pins 65, 73, and gear sectors 85 is clearly shown in the timing chart of Fig. 21.

An inspection of Figure 3 shows that when the carriage is in the initial position on the extreme right, it is not aligned with the four left-hand pairs of sensing pins 65, 73. Similarly, when the carriage is on the extreme left, it is clear of the three right-hand pairs of sensing pins. An arrangement shown in Figs. 2, 2A, and 5 serves to put out of action those sensing pins 65, 73 and gear sectors 85 which are clear of the carriage. Gear sectors 85 associated with four left-hand and three right-hand pairs of sensing pins are extended downwards as at 105, Fig. 2A; each extension 105 co-acts with a latch 106 pivoted at 107 in the supporting structure and connected by a link 108 to a rocker 109 pivoted at 110 and biased by spring 111, Fig. 5, on to a stop 112. Rockers 109 co-act with a knock-out plate 113 secured to the carriage. As long as a rocker 109 abuts against the knock-out plate 113, the associated latch 106 unlocks the tail 105 on the respective gear sector 85, as shown on the right of Fig. 5, so that the gear sector is free to operate as heretofore described. If the knock-out plate is not in alignment with a rocker 109, this rocker swings on to its stop 112 and the associated latch 106 locks tail 105 of gear sector 85, as shown on the left of Fig. 5, so that this gear sector cannot move forward (anti-clockwise as viewed in Fig. 2A). However, gear sectors 85 which are locked by their latches 106 are free to move clockwise for the purpose of carry-over, as will be explained hereafter. The gear sector 85 on the extreme left is prevented from an anti-clockwise movement by a fixed stop (not shown), since this gear sector serves only for the carry-over.

Products register

In the present embodiment, the products register, Figs. 1, 2A, 7, comprises thirteen numeral wheels 114 rotatable on shaft 115 journalled in bearings 116, 117 in machine frames 2, 3. Numerals on wheels 114 are visible through apertures 118 in machine cover 57. Fixed to each numeral wheel 114 is a gear 119 and (except the wheel of the highest denomination) a one-tooth pinion 120, Fig. 7. The hub of each wheel 114 is extended axially to form a zero lug 121 co-acting with a conventional comb-bar 122 slidable in a key-way in shaft 115. Wheels 114, which may be slotted to facilitate the assembly, are spaced apart by slotted collars 123. Comb-bar 122 is pressed into a cam-like recess in bearing 116 by a spring 124; when shaft 115 is rotated as will be described in due course, comb-bar 122 is forced to the right out of the recess in bearing 116, so that elevations 125 on comb-bar 122 pick up respective zero lugs 121 and restore the numeral wheels 114 to the zero position. On completion of turn of shaft 115 the comb-bar 122 is again shifted into the recess in bearing 116. Gears 119 are located by means of detents 126, Fig. 2A, rockable on rod 127 fixedly mounted in machine frames 2, 3; detents 126 are biased by springs 128 anchored in a bar 129 secured to machine frames 2, 3.

Figure 16:
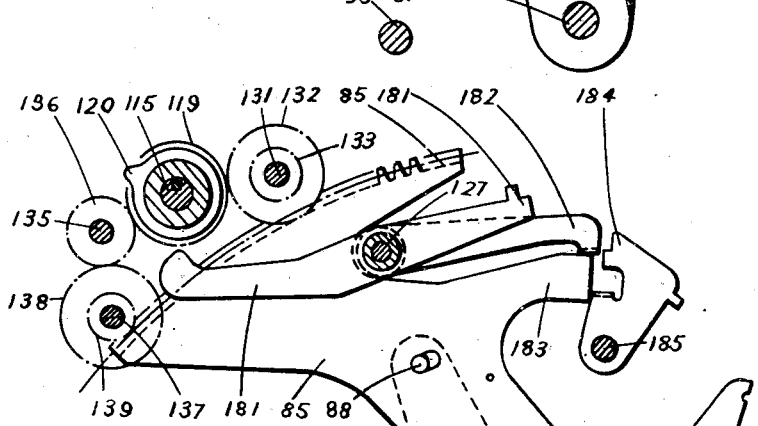

Rockably mounted on shaft 115 is a frame 130 in which is fixedly mounted a shaft 131. Gears 132 rotatable on shaft 131 each mesh with a gear 119 on a numeral wheel 114; fixed to each gear 132 is a pinion 133 which may be meshed with the respective gear sector 85, as will be described hereafter. A second frame 134 rockable on shaft 115 supports a shaft 135 with idler gears 136 and another shaft 137 with gears 138. Each idler 136 meshes with a gear 119 on a numeral wheel 114 and also with a gear 138; fixed to each gear 138 is a pinion 139 which may be meshed with the respective gear sector 85. After the products register has been cleared, the parts are in the position of Fig. 2A, neither the pinions 133 nor the pinions 139 being in mesh with gear sectors 85. During additive operations (addition and multiplication) gears 119 are driven clockwise by pinions 133 which are in mesh with gear sectors 85, pinions 139 being out of mesh, as shown in Fig. 8, wherein the various gears and pinions are represented by dash-and-dot pitch circles. During negative operations (subtraction and division) gears 119 are driven in the opposite direction (anti-clockwise) by pinions 139 which are in mesh with gear sectors 85, while pinions 133 are out of mesh, as shown in Fig. 16. It will be remembered that the stroke of gear sectors 85 is respectively proportionate to the digits to be entered into the register; thus, the movement of gears 119 and wheels 114 is also proportionate to the respective digits, which may be entered either additively or subtractively.

As shown in Fig. 12, frame 130 is biased upwards at each end by a spring 140 anchored in the supporting structure. Pivoted at 141 at each side of frame 130 is a rod 142 linked at 143 to a rocker 144 pivoted at 145 to a bracket 146 secured to the base plate 1. Journalled in each rocker 144 is a roller 147 co-acting with a cam 148, Fig. 13, rotatable on main operating shaft 149 journalled in bearings 150, 151 in machine frames 2, 3. In position shown in Figs. 3, 3A cams 148 are splined to shaft 149 by lugs 152, 153 on a sliding key 154 shiftable in a keyway in shaft 149. Cams 148 are so shaped that, when splined to shaft 149 and rotated, they cause during the return stroke of gear sectors 85 the rockers 144 and the frame 130 to rock downwards, so that pinions 133 are meshed with gear sectors 85 and drive the numeral wheels 114 additively. During the forward stroke of gear sectors 85 pinions 133 remain out of mesh. The exact co-ordination of cams 148 with reciprocating cams 94 is shown in the timing chart of Fig. 21.

Figure 11:
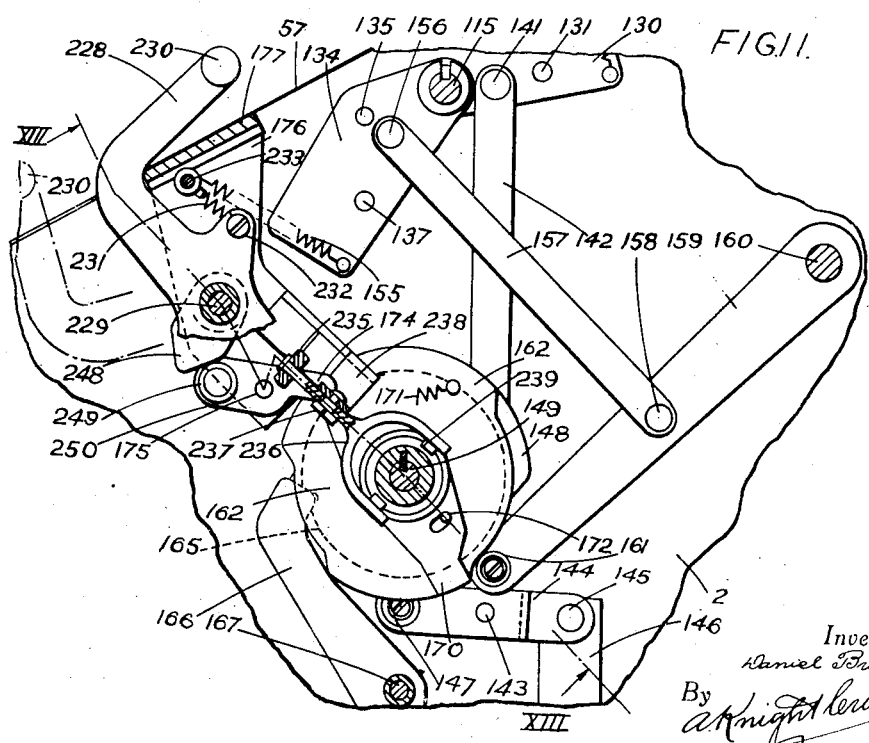

Similarly, frame 134 is biased clockwise by springs 155, Fig. 11. Pivoted at 156 at each side of frame 134 is a rod 157 linked at 158 to a rocker 159 pivoted at 160 in the supporting structure. Journalled in each rocker 159 is a roller 161 co-acting with a cam 162 rotatable on main shaft 149. Cams 162 may be splined to shaft 149 by lugs 163, 164, Figs. 3, 3A, on key 154 when the latter is shifted to the left. Cams 162 are shaped similarly to cams 148; they bring the pinions 139 into mesh with gear sectors 85 during the return stroke of the latter, so that the numeral wheels 114 are driven subtractively.

Fixed to cams 148, 162, respectively, are stop discs 165, Figs. 11 and 12, co-acting with detents 166 rockable on rods 167 and biased by springs 168 anchored on rod 91. Stop discs 165 serve to locate the cams yieldingly and to prevent them from rotation due to friction, while allowing them to rotate when positively splined to shaft 149 by means of key 154.

Loosely mounted on hubs of cams 148, 162, respectively, are plates 169, 170, Figs. 12, 11, biased clockwise by springs 171 anchored in the respective cams. Pins 172 fixed to the cams engage slots in the respective plates 169, 170. The lower end of each plate 169, 170 is adapted to co-operate with the roller 147, 161, respectively, while the other end is formed with an abutment 173 co-acting with a pawl 174 fast on a shaft 175 journalled in machine frame 2 and a bracket 176, Fig. 13, fixed to a cross-bar 177 secured to machine frames 2, 3. A plate 178, Fig. 10, fast on shaft 175 is biased clockwise by a spring 179 anchored at 180 in machine frame 2. Spring 179 is considerably stronger than springs 171; consequently, when towards the end of a revolution abutments 173 on plates 169 or 170, as the case may be, are engaged by pawls 174, the respective plates are retarded relatively to their respective cams 148 or 162, so that at the end of revolution plates 169 (or 170) remain in the position shown in Fig. 12; plates 169 (or 170) still support rollers 147 (or 161, respectively), so that the register wheels 114 remain in mesh with gear sectors 85 via pinions 133 (or 139, as the case may be). Thus, the intermediate carry-over may be effected as will be described hereafter. Should the machine be again operated in the same sense as before (that is without a change from additive to subtractive operation or vice versa), abutments 173 are adapted to push the respective pawls 174 out of the way, since pins 172 now rest against the end of slots in respective plates 169 (or 170) and thus couple the plates positively to the respective cams 148 or 162. As soon as abutments 173 clear the ends of pawls 174, springs 171 swing the plates 169 (or 170) clockwise until pins 172 abut against the opposite ends of their slots, as shown in Fig. 11; thus, the cams 148 (or 162) alone remain effective with regard to rollers 147 (or 161), and the operation proceeds according to the timing chart of Fig. 21. However, should the next operation be reversed from additive to subtractive or vice-versa, shaft 175 is rocked slightly anti-clockwise by means to be described hereafter, and pawls 174 release the previously engaged abutments 173; plates 169 (or 170) assume, in relation to rollers 147 (or 161), the inoperative position shown in Fig. 11, so that the register wheels 114 are demeshed from gear sectors 85.

Figure 15:
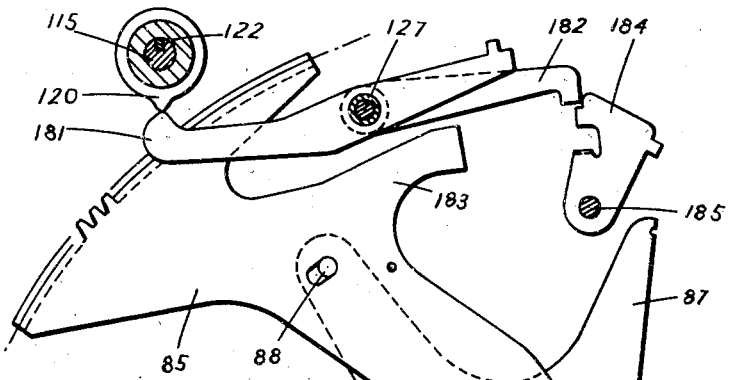

The carry-over is effected by one-tooth pinions 120 on register wheels 114 co-acting with carry pawls 181, Figs. 15, 16, 7. Carry pawls 181 are shaped substantially like detents 126, and they are biased by individual springs 128, Fig. 2A, like the latter. Each carry pawl 181 has an arm 182 co-acting with an extension 183 on gear sector 85 of the next higher denomination, and also with a latch 184 rockable on shaft 185 and biased by a spring 186 anchored in a bar 187. In the normal, e.g. non-carrying position shown in Fig. 2A, arm 182 locks the co-acting extension 183 of gear sector 85 of the next higher denomination. When the one-tooth pinion 120 becomes aligned with the end of carry pawl 181, it causes the pawl to swing into position shown in Fig. 15, in which position the carry pawl is locked by its latch 184. Thus, gear sector 85 of the next higher denomination is, on completion of its return stroke, not arrested by the arm 182, and moves one more step under the influence of its spring 89 into position shown in Fig. 16, thus effecting the carry-over. This gear sector 85 also slightly rocks the latch 184 clockwise so as to unlatch the respective arm 182 in readiness for the next operation. Should the carry occur while the gear sector 85 of the next higher denomination is stationary, the carrying operation is effected, as described, immediately the reciprocating cams 94 restore the levers 87 into the initial position.

While there is always sufficient time for the intermediate carry (that is, carry made necessary by a carry in the next lower denomination) at the end of an operation, there may be lack of time at the end of the first half-turn of cam shaft 95 if there is to be a carry on a carry. In this case there may be the danger that the register wheels 114 may be demeshed from gear sectors 85 before all gear sectors have had time to complete the additional step required for the carry operation. In order to avoid this difficulty, reciprocating cams 94 are shaped at 188, Figs. 2A and 21, so as to rock the levers 87 slightly anti-clockwise from the position shown in Fig. 2A into position (relatively to gear sector 85) of Fig. 16, with the result that pins 88 now lock the associated gear sectors 85 as soon as cams 148, 162 begin to demesh pinions 133, 139, respectively. Any gear sector 85 which thus has been prevented from effecting the carry at the end of the first half-turn will do so at the end of the full cycle, since the respective carry pawl 181 and arm 182 will remain in the carrying position of Fig. 15 due to latch 184. This delayed action is permissible since the carry on a carry never exceeds 1 in a complete cycle. The direct carry (that is, carry due to a reading entered from a partial products plate 64 or 72 is always effected immediately at the end of the respective half-cycle without any delayed action.

*Multiplier (quotient) register*

The multiplier register, Figs. 1, 2, 7, of the present embodiment comprises six numeral wheels 189 each having white numerals (for additive calculations) and red numerals (for subtractive calculations) visible through apertures 190 in machine cover 57. Wheels 189 are rotatable on shaft 191 journaled in bearings 192, 193, Fig. 7, in machine frame 2 and in a bracket 194 secured to cross-bar 177, respectively. Fixed to each wheel 189 is a gear 195 meshing with a gear 196 rotatable on a shaft 197 fixedly mounted in frame 2 and bracket 194. Zero lugs 198 on wheels 189 cooperate with the usual comb-bar 199 and spring 200 for clearing purposes. Gears 195 are located by detents 201, Fig. 2, rockable on rod 202 fixedly mounted in frame 2 and bracket 194. Springs 203 anchored on cross-bar 177 bias the detents 201 on to gears 195.

Gears 196 are rotated, one at the time, by a driver 204 with nine teeth of unequal length, as shown in development in Fig. 18. Driver 204 is slidably but not rotatably mounted on flat shaft 205, Fig. 7, journaled in bearings 206, 207 in frame 2 and bracket 194, respectively. Driver 204 is located between the left-hand carriage plate 4 and a plate 208 fixed hereto; thus, it is caused to slide axially along shaft 205 in conformity with changes in denominational and/or digital positions of the carriage. The length of teeth on driver 204 corresponds to the digital positions, as indicated diagrammatically in Fig. 18. Thus, in the position "1" as shown, the longest tooth will drive the gear 196, with which the driver is aligned due to the denominational position of the carriage, one step, and will also advance the associated numeral wheel 189 one step during a revolution. In position "2" (that is, when driver 204 is shifted to the left so that the dotted line designated "2" is aligned with the left-hand gear 196) the two longest teeth will advance this gear 196 and wheel 189 two steps, and so forth. In position "9" all teeth on driver 204 will advance the wheel 189 nine steps during a single revolution of driver 204.

Since in the machine made according to the present invention the multiplication by any digit 1–9 requires but a single operating cycle, there is no need for the so called short-cut multiplication, and consequently the multiplier register is not fitted with a carry device. However, if so desired, any suitable type of a carry device may be incorporated.

*Driving and operating means*

The machine may be driven by hand or by motor. In the present embodiment it is operated by a crank 209 with handle 210, Figs. 1, 3A, 13, fast on main shaft 149. The initial position of handle 210 is determined in the customary manner by means of a spring-loaded plunger (not shown). Fast on shaft 149 is a gear 211, Fig. 3A, to which is fixed a ratchet wheel 212 co-acting with a pawl 213, Fig. 14, rockable on rod 167 and biased by a spring 214 to ensure that the shaft 149 is rotated only in the clockwise direction. Gear 211 meshes with gear 215 fast on cam shaft 95, Fig. 3A.

Gears 216, 217, Fig. 3, rotatable on shaft 149 serve to drive the multiplier register. When the machine is conditioned for additive operation, gear 216 is splined to shaft 149 by lug 218 on keys 154, while gear 217 remains free. Gear 216 meshes with gear 219 journalled on trunnion 220 secured to machine frame 2; gear 219 meshes with gear 221 rotatable on trunnion 222 and meshing with gear 223, Fig. 7, fast on driver shaft 205. When the machine is conditioned for subtractive operation and key 154 is shifted to the left as viewed in Fig. 3 in a manner to be presently described, lug 218 releases gear 216 while lug 152 splines the gear 217 to shaft 149. Gear 217 meshes, via gear 224 on trunnion 220, gear 225 on trunnion 222, and gear 226, Fig. 7, rotatable on shaft 197, with gear 227 fast on driver shaft 205. Gear 227 turns the driver shaft 205 substractively, that is clockwise as viewed in Fig. 2.

The machine may be conditioned for additive or subtractive operations by means of a control lever 228, Figs. 11, 13, rockable on a shaft 229 fixedly mounted in machine frame 3 and bracket 176. Control lever 228 protrudes through a slot in machine cover 57; it has a handle 230 which may be aligned either with + or − marked on machine cover, Fig. 1. In either position the control lever 228 is located by a tumbler spring 231 rockably mounted in the control lever as at 232 and at 233 in the machine frame 3. A face cam 234, Fig. 13, fixed to control lever 228 co-acts with roller 235 rotatable on clutch fork 236 pivoted at 237 in bracket 238 fixed to bracket 176. Clutch fork 236 has two pins 239 engaging a circular groove in disc 240 slidable on shaft 149 and fixed to plate 241 secured to key 154, Fig. 3A. Spring 242 inserted into a bore in shaft 149 is supported by screw 243 which secures the crank 209 on shaft 149. Spring 242 presses against the end of key 154 and tends to push it to the left, thus biasing the clutch fork 236 clockwise as viewed in Fig. 13 so as to maintain the roller 235 in contact with face cam 234. Control handle 230 being at +, key 154 is in the position shown in Figs. 3, 3A; it splines to shaft 149 the "additive" cams 148 and the gear 216 by means of lugs 152, 153 and 218, respectively. When control handle 230 is at −, in position indicated by dash-and-dot lines in Fig. 11, key 154 is shifted to the left as viewed in Figs. 3, 3A and couples to shaft 149 the "subtractive" cams 162 and the gear 217 by means of lugs 162, 164, and 152, respectively.

Pins 244, Fig. 3A, fixed to plate 241 is adapted to slide in a hole in gear 211. Key 154 being in the "additive" position shown in Fig. 3A, the end of pin 244 protrudes through gear 211 to co-act with rocker 245, Fig. 14, pivoted at 246 in machine frame 3 and linked at 247 to the rod 29 linked as already described to bracket 28 fast on shaft 20. Shortly before a revolution of main shaft 149 is completed, pin 244 strikes rocker 245 and causes it to swing anti-clockwise, thus forcing the escapement pawl 31, Fig. 4, fast on shaft 20 to swing upwards and to release the rack 32, whereupon the carriage is shifted by spring 16 into the next lower denominational position as already described. This action takes place during additive operations only; during subtractive operations pin 244 is withdrawn to the left as viewed in Fig. 3A, and does not influence the rocker 245 and the shift mechanism. Thus, during subtractive operations the carriage is not shifted automatically after each revolution of main shaft 149. This is of great importance, since in division the operator has to guess the quotient digit, and may have to divide repeatedly in the same denominational position of the carriage before he obtains a remainder which is smaller than the divisor.

Cam piece 248, Fig. 11, fixed to control lever 228 co-acts with a roller 249 journalled in a tail 250 formed on pawl 174 shown at the right-hand end of shaft 175 in Fig. 13. Whenever the control handle 230 is shifted from + to − or vice-versa, cam piece 248 causes this pawl 174 and shaft 175 to rock anti-clockwise as viewed in Fig. 11, thus releasing plates 169 or 170 which previously have been engaged by pawls 174. In this manner the products register wheels 114 are demeshed from gear sectors S85 prior to a new calculation whenever the operation is reversed.

The products register is cleared by means of a lever 251, Fig. 7, fixed to bush 252 journalled in bearing 253 in machine frame 2. Fixed to bush 252 is a bracket 254 in which is pivoted a pawl 255, Fig. 10, as at 256; it is biased by a torsion spring 257 into engagement with one-way ratchet wheel 258 rotatable on shaft 259 which is independently rotatable in bush 252, Fig. 7, and bearing 260 in bracket 261 secured to cross-bar 177. Spring 262, Fig. 10, anchored at 263 in machine frame 2 tends to rotate the bracket 254 clockwise. A mutilated gear 264 fixed to bracket 254 is adapted to drive a pinion 265 journalled on trunnion 266 secured to machine frame 2. Fixed to pinion 265 is gear 267 meshing with gear 268 fast on shaft 115 of the products register. Since the clearing operation cannot begin before the numeral wheels 114 are demeshed from the gear sectors 85, a cam member 269 with four lobes is fixed to gear 264 and is adapted to co-act with a rocker 270 loosely mounted on rod 202. The movement of clearing lever 251 is limited by fixed stops (not shown) to approximately one-quarter turn, and the cam member 269 is adapted to swing the rocker 270 clockwise at the beginning of this movement. Rocker 270 is connected by link 271 to the plate 178 fast on shaft 175; thus at the beginning of the clearing operation shaft 175 is rocked so that pawls 174 hereon release the delaying plates 169, 170 on reversing cams 148, 162 to demesh the products register as already described. Some teeth on gear 264 are cut away so that during this demeshing operation this gear does not drive the associated pinion 265; on completion of the demeshing operation and until the end of the quarter-turn movement of clearing lever 251, gear 264 turns gear 268 one complete turn, whereby the comb-bar 122, Fig. 7, restores the numeral wheels 114 as already described. During the return stroke of clearing lever 251, which is effected by spring 262, the ratchet wheel 258, gear 264, and cam member 269 do not rotate, a frictional movement being prevented by a pawl 272, Fig. 10, rockable on rod 202 and biased by spring 273 anchored at 189 into engagement with ratchet wheel 258.

The multiplier register is cleared in a similar manner by a clearing lever 274, Fig. 7, fast on shaft 259. A bracket 275 fast on shaft 259 has pivoted to it at 276 a pawl 277 co-acting with a ratchet wheel 278 rotatable on shaft 259. Pawl 277 and wheel 278 are substantially like pawl 255 and wheel 258, respectively; pawl 277 and bracket 275 are biased by springs (not shown) exactly like springs 257 and 262, respectively; ratchet wheel 278 is located by a spring-loaded stop pawl (not shown) exactly like pawl 272. Fixed to ratchet wheel 278 is a gear 279 meshing with a pinion 280 rotatable on rod 202; a gear 281 fixed to pinion 280 meshes with gear 282 fast on shaft 191 of the multiplier register. As in the case of lever 251 for clearing the products register, the movement of clearing lever 274 is limited to about a quarter-turn, and the ratio of gears 279—282 is such that during this movement gear 282 and shaft 191 complete a full turn, so that comb-bar 199 restores the numeral wheels 189 as heretofore described. Since both clearing levers 251, 274 are arranged close together and have the same stroke, they may be conveniently depressed together, so that both registers are cleared simultaneously.

Various auxiliary devices such as interlocks for the main operating handle 210, clearing levers 251, 274, shift levers 18, 40, and control handle 230, adjustable decimal points, and so forth, may be incorporated in the machine; they have not been shown in the drawings as they are well-known to those skilled in the art and are not essential for the proper understanding of the present invention.

*Operation*

Assuming it is desired to multiply 475 by 381, the multiplicand is set up by adjusting the setting levers 58 so that numerals 4, 7, 5 appear in the hundreds, tens, and units apertures 62 (that is, in the three right-hand apertures, Fig. 1), respectively; this brings into working position partial product plates 64, 72 shown in Fig. 19. The denominational shift lever 18 is then depressed and pushed to the left until a coloured mark 55 appears in the third (hundreds) aperture 56, according to the highest denomination of the multiplier. Now, the digital shift lever 40 is pulled forward into alignment with numeral 3; this numeral appears in the third aperture 56, and the selected partial products plates 64, 72 reach the position shown at the bottom of Fig. 19. Control handle 230 being at +, the multiplication by 300 is effected by a single revolution of operating handle 210. During this revolution, cams 94 reciprocate the gear sectors 85 twice, while cams 104 adjust feelers 83 first in line with upper sensing pins 65 and then with lower sensing pins 73; cams 148 mesh pinions 133, Fig. 8, with gear sectors 85 during the two return strokes of the latter, so that products register wheels 114 are driven additively. As already described, the amount 142,500=475×300 will be entered in the products register. The multiplier register is driven additively through gears 216, 219, 221, Fig. 3, gear 223, Fig. 7, shaft 205, driver 204, and the third (hundreds) gear 196, so as to enter a white "3" into the hundreds numeral wheel 189. Towards the end of the cycle pin 244, Fig. 14, operates rocker 245, rod 29, bracket 28, and shaft 20 to trip the shift pawl 31, Fig. 4, so that the carriage shifts to the right into the tens denominational position under the influence of spring 16. Digital shift lever 40 is now re-set for "8" and handle 210 is again rotated; the amount 38,000=475×80 is entered into the result register, so that it shows 180,500=142,500+38,000. The carry occurring at the end of second cycle from the hundreds to the thousands denomination and from the thousands to the tens-of-thousands denomination is effected by one-tooth pinions 120, Fig. 15, carry pawls 181, arms 182, and latches 184. At the end of second cycle, the multiplier register shows "380," and the carriage shifts into the units denominational position. Digital shift lever 40 is now re-set for "1," so that partial products plates 64, 72 reach the position shown on top of Fig. 19, and the handle 210 is rotated once more; the amount 475 is added to 180,500 already in the products register, which thus shows the result as 180,975, while the multiplier register shows "381," the multiplicand 475 being still shown in the set-up apertures 62.

The whole calculation comprises one manual shift, three turns, and three settings of lever 40, while in the customary repeated addition machines this calculation involves three shifts and twelve turns. Obviously, in the case of repeated digits of the multiplier there is no need to re-set the digital lever 40; thus, in order to multiply by 5505, the lever 40 is set to "5" only once, the denominational shift lever 18 being depressed after the second turn to skip the zero tens; the whole calculation involves one digital setting and three turns instead of the customary fifteen turns.

Assuming now it is desired to divide 126715 by 1293. The set-up mechanism is cleared by means of lever 78, Fig. 1, and is re-set for the dividend 126715 which is then entered into the products register 114 by a turn of handle 210, the carriage being in the initial position on the extreme right. The set-up mechanism is then re-set according to the divisor 1293, and the carriage is shifted to the tens denominational position, since the quotient is obviously smaller than 100. It will be seen at a glance that the upper part of the dividend, namely 12671, is nearly ten times the divisor; consequently, the operator will set the digital lever 40 so that "9" appears in the tens aperture 56. Control handle 230 is now set to —, so that key 154, Fig. 3, 3A, couples to the main shaft 149 the substractive cams 162 and gear 217, and the operating handle 210 is rotated once. Cams 162 mesh pinions 139, Fig. 16, to gear sectors 85 during the two return strokes of the latter, so that the amount 1293×90=116370 is entered substractively into the products register 114, which then shows 10345=126715−116370. The occurring carry is effected in the same manner as before but subtractively, since the drive of the numeral wheels 114 is reversed due to idler gears 136. During this cycle the tens numeral wheel 189 of the multiplier register has been driven subtractively nine steps through gears 217, 224, 225, Fig. 3, gears 226, 227, Fig. 7, shaft 205, driver 204, and the tens gear 196, so that the tens numeral wheel 189 now shows a red "9." The carriage is now shifted into the units denominational position by depressing the shift lever 18, since in division the carriage is not stepped automatically, as the operator may not always guess the quotient digit correctly and may have to repeat the operation in the same denominational position of the carriage. The operator may not guess the correct units digit of the quotient at once, but he can easily see that it is greater than "7," since 1293 is less than 1300, and 1300×7=9100 is less than the remainder 10345. Consequently, the digital shift lever 40 is set to "7," and handle 210 is again rotated, thus subtracting from the products register 114 9051=1293×7. The products register now shows 1294=10345−9051, and the multiplier register shows 97. Since the remainder is still greater than the divisor, the operator not having guessed the quotient digit correctly, the digital lever 40 is re-set to "1," and handle 210 is again rotated. The products register now shows the remainder 1, and the multiplier register shows the quotient 98. The whole calculation has taken three turns, but it could have been done in two turns; of course, the conventional method of division used with repeated addition machines, namely repeated subtraction of the divisor, may be used in this machine, but it would involve seventeen turns. It will be readily seen that the machine made according to the invention offers an improved method of division, which gives full scope to the skill of the operator and achieves a considerably increased speed of operation.

Addition and subtraction may be effected in the initial position of the carriage, the control handle 230 being at + or −, respectively.

Modification

According to a modification of the present invention, the tens and the units of partial products of each set-up digit may be arranged on a single plate 283, Fig. 22. A comparison with Fig. 20 shows that each partial products plate 283 combines the units plate 72 side by side with the respective tens plate 64; thus, there is only a single plate 283 for each digit of each set-up denomination. To avoid overlapping, partial products plates 283 associated with the odd set-up denominations (units, hundreds, and so forth) may be arranged in the lower bank on shaft 70, Fig. 2, the plates 283 of the even set-up denominations (tens, thousands, and so forth) being arranged in the upper bank on shaft 41. As clearly shown in Fig. 22, the tens of the units denomination are transversely aligned with the units of the tens denomination in the same manner as in Fig. 19. Fig. 22 illustrates the calculation 123456789×1, as indicated by the numeral 1 adjacent to the plate 283 designated 8×10. Plates 283 of the "even" bank may be arranged exactly like plates 64 in bails 59, while the "odd" plates 283 may be arranged, like plates 72, in bails 71 connected by rods 67 to setting levers exactly similar to bails 59 except that they do not have plates 64. Apart from this modified arrangement of the partial products plates, the machine is otherwise exactly like that described in the first embodiment.

It will be evident that the machine heretofore described may be modified in many ways without departing from the spirit of the present invention.

In the accompanying claims, the "first factor" refers to values to be entered into the products register, that is, multiplicands, dividends, divisors, and values to be added or subtracted, whereas the "second factor" relates to values to be entered into the multiplier register, that is, multipliers or quotients. In the case of addition and subtraction "1" is entered into the multiplier register, the carriage being positioned on the extreme right.

What I claim is:

1. In a calculating machine comprising set-up means for the two factors, representations of partial products, and a stationary products register: a displaceable carriage on which the said representations are mounted, sensing and value-entering means for entering into the products register the whole product of the set-up first factor multiplied by the set-up digit of the second factor either additively or subtractively during a single operating cycle and whilst the carriage remains stationary, control means for conditioning the machine for multiplication and division, manual shift means for selectively displacing the carriage into a plurality of positions each associated with a denomination of the second factor, and automatic shift means for automatically displacing the carriage at the end of each operating cycle into the position associated with the next denomination of the multiplier, the said automatic shift means being operative only when the said control means is set for multiplication.

2. In a calculating machine comprising set-up means for the two factors and representations of partial products: a stationary products register comprising a plurality of gears each fixed to a denominational numeral wheel, toothed racks each associated with one of said gears, a carriage on which the said representations are mounted, a carriage shift mechanism for selectively associating the said representations with the said racks, means for reciprocating the said racks in accordance with representations with which they are selecively associated, additive gear trains adapted when driven by the said racks to drive the said gears additively, substractive gear trains adapted when driven by the said racks to drive the said gears subtractively, additive meshing means and subtractive meshing means for meshing respectively the said additive gear trains and the said subtractive gear trains with the said racks, control means settable for multiplication-addition and for division-subtraction and adapted to render operative the said additive meshing means when set for multiplication-addition and the said subtractive meshing means when set for division-subtraction, an actuator operatively associated with the said additive meshing means and adapted to operate the said carriage shift mechanism at the end of each operating cycle when the said control means is set for multiplication-addition, and manual operating means for the said carriage shift mechanism.

DANIEL BROIDO.

REFERENCES CITED

The following references are of record in the file of this patent:

UNITED STATES PATENTS

| Number | Name | Date |
|---|---|---|
| 556,720 | Bolles | Mar. 17, 1896 |
| 558,913 | Steiger | Apr. 21, 1896 |
| 1,311,373 | Barr | July 29, 1919 |
| 1,957,960 | Hosack | May 8, 1934 |
| 2,043,221 | Ball | June 9, 1936 |
| 2,229,901 | Richards | Jan. 28, 1941 |
| 2,273,237 | Walter | Feb. 17, 1942 |
| 2,342,529 | Chase | Feb. 22, 1944 |
| 2,388,209 | Friden | Oct. 30, 1945 |

FOREIGN PATENTS

| Number | Country | Date |
|---|---|---|
| 9,563 | Great Britain | June 19, 1912 |
| 520,226 | Great Britain | Apr. 18, 1940 |